(12) United States Patent
Hehl

(10) Patent No.: US 6,769,892 B1
(45) Date of Patent: Aug. 3, 2004

(54) INJECTION MOLDING MACHINE FOR PROCESSING PLASTICS

(76) Inventor: Karl Hehl, Arthur-Hehl-Strasse 32, D-72290 Lossburg (DE)

( * ) Notice: Subject to any disclaimer, the term of this patent is extended or adjusted under 35 U.S.C. 154(b) by 0 days.

(21) Appl. No.: 10/009,550

(22) PCT Filed: May 2, 2000

(86) PCT No.: PCT/EP00/03923

§ 371 (c)(1),
(2), (4) Date: Nov. 5, 2001

(87) PCT Pub. No.: WO00/67984

PCT Pub. Date: Nov. 16, 2000

(30) Foreign Application Priority Data

May 5, 1999  (DE) .......................................... 199 20 626

(51) Int. Cl.[7] .......................... B29C 45/77; B29C 45/80
(52) U.S. Cl. .......................... 425/3; 264/40.5; 425/145; 425/150; 425/589
(58) Field of Search .......................... 425/3, 145, 150, 425/589, 595; 264/40.5

(56) References Cited

U.S. PATENT DOCUMENTS

| | | | |
|---|---|---|---|
| 4,895,505 A | * | 1/1990 | Inaba et al. .................. 425/145 |
| 6,051,896 A | | 4/2000 | Shibuya et al. |
| 6,132,198 A | * | 10/2000 | Tamaki et al. .................. 425/3 |

FOREIGN PATENT DOCUMENTS

| | | |
|---|---|---|
| DE | 37 15 161 | 11/1987 |
| DE | 44 45 283 | 6/1996 |
| EP | 0 280 743 | 9/1988 |
| EP | 0 361 670 | 4/1990 |
| EP | 0 662 382 | 7/1996 |
| EP | 0 744 815 | 11/1996 |
| JP | 06 319250 | 11/1994 |

OTHER PUBLICATIONS

Masatoyo Sogabe, Mitsuyuki Taniguchi, Yasusuke Iwashita, Yoshifumi Shimura, "New Linear Motors and Its Applications", Fanuc Tech. Rev., 11, 2, pp. 25–36, Dec., 1998.
LinMot, Datenblatt, "Linearmotoren LinMot P", Sulzer Electronics AG, Zurich; pp. 14–16.

* cited by examiner

*Primary Examiner*—Tim Heitbrink
(74) *Attorney, Agent, or Firm*—Cantor Colburn LLP

(57) ABSTRACT

In an injection molding machine the injection molding unit and the mold closing unit are at least are at least partially operated by electrical drives in form of a linear motor. The rotor and the stator have cylindrical surfaces which are arranged concentrically. The stator windings are symmetrical to the motion axis of the linear motor. Several equally acting first cylindrical surfaces are interleaved with a corresponding number of equally acting other cylindrical surfaces and are respectively operated together for operative connection. This results in a linear motor that is able to provide the advance forces required for injection molding.

14 Claims, 16 Drawing Sheets

INJECTION MOLDING MACHINE FOR PROCESSING PLASTICS

FIELD OF THE INVENTION

The invention relates to an injection molding machine and, more particularly, to an injection molding machine for processing plastics materials and other plasticisable compounds including at least partially electrically operated driving units to operate the machine.

DESCRIPTION OF THE RELATED ART

A linear motor, which is used as the driving unit and is provided with a rotor and stator, is known for plastics material molding machines from DE-T2 37 82 817, which corresponds to EP 0 280 743 B1, and JP-A 63-1516, rotor and stator having cylindrical surfaces which are in operative connection with one another. These surfaces permit the magnetic face, which is needed for the required advancing forces, to be suitably incorporated in the drive axis. If stator windings are symmetrically disposed in accordance with DE-A 44 45 283, the relatively high bearing forces caused by the magnetism are mutually excluded. However, even there, mention is constantly made in the description of only one primary part and one secondary part, which parts co-operate accordingly with one another. If FIG. 3 there is additionally considered, it becomes apparent that the internally situated pipe is merely a carrier pipe which, just like the externally situated pipe, is neither a stator nor a rotor. When such a linear motor is used, there is a simultaneous saving in the complex converting means, which are susceptible to wear and serve to convert a rotary movement into a linear movement, such as, for example, a transmission mechanism, a spindle, levers and toothed rods (cf also EP-A 744 815), but the forces, which are required for a plastics material injection molding machine, cannot yet be applied, therefore to a sufficient extent.

Electrical driving units are also often used in conjunction with injection molding machines. thus, for example, it is known from EP 0 662 382 to stack together various hollow-shaft motors inside the injection molding unit to inject the plasticised compound into the injection mould and to fit the nozzle onto the injection mould. However, it is necessary for such purpose, and time-consuming, to convert the rotary movements, produced by the hollow-shaft motors, into translatory movements. However, since all of the shafts or axis for the injection molding machine are translatory shafts with the exception of the feed screw for metering the material to be plasticised, the use of such hollow-shaft motors is only recommended to a limited extent.

From handling techniques and medical techniques, linear motors are known which, however, do not have sufficient advancing forces, so that the linear motors, which are mainly fitted in a flat manner, are not suitable for use in an injection molding machine. (Company brochure entitled "New linear Motors and its applications" produced by the company called Fanuc, published in FANUC Tech. Rev. 112, pp. 25–36 (December, 1998); specification sheet linear motors entitled Lin.Mot P belonging to Sulzer Electronics AG, Zurich.)

SUMMARY OF THE INVENTION

The present invention provides a linear motor for an injection molding machine, which motor can also apply the advancing forces required for an injection molding machine.

An injection molding machine for processing plastics materials and plasticisable materials of the present invention includes an injection molding unit and a mould closing unit, which are operated at least partially by an electric driving unit including at least one linear motor, which has a rotor with magnets, disposed along a first cylindrical surface, and a stator with stator windings disposed along a second cylindrical surface, the first and second cylindrical surfaces of stator and rotor being concentrically disposed, and the stator windings being substantially symmetrical relative to an axis of movement of the linear motor. Additionally, a plurality of identically acting first surfaces are stacked with a corresponding number of identically acting second surfaces, the first and/or second surfaces each being operable jointly in operative connection.

In consequence, various cylindrical faces can be stacked one inside the other so that a plurality of identically acting magnetic faces are produced which contribute towards increasing the advancing forces up to a range which is required for plastics material injection molding machines, e.g. for applying the closing force. The alleged disadvantage is tolerated in such case, i.e. that the linear motor can tilt more easily so that greater demands for precision are to be made on the means for guiding the parts of the linear motor. However, this is compensated for again by the more compact construction which can be achieved.

Although it is known, in prior art, which forces are required for an injection molding machine to produce molded parts, only circular arrangements were proposed there, the rotor and stator having concentric surfaces, since the person skilled in the art has probably concluded therefrom, incorrectly, that a corresponding alternative arrangement cannot be achieved to a suitable extent. In order to operate the surfaces jointly in operative connection with one another in fact, said surfaces have to be worked with appropriate precision. In such case, the precision required for the operation of the linear motor increases exponentially with an increasing spacing from the central line of the cylindrical surfaces so that the linear motor can tilt more easily, the greater this spacing is, more especially when the linear motor is to be kept short in order to achieve as compact a construction of the entire injection molding machine as possible. This is further emphasized by the high temperatures which occur at high forces. This may probably also be the reason why, despite their advantages, linear motors have not yet been successful in the field of plastics material injection molding machines, since hitherto the corresponding forces could still not be applied.

Cooling ducts may be disposed in the cylindrical walls of the stator, so that the heating, caused by the current, can be reliably dissipated. The cooling medium used therefor can, at the same time, be used to control the temperature of other component parts in the injection molding machine.

BRIEF DESCRIPTION OF THE FIGURES

The invention is explained hereinafter with reference to a plurality of embodiments which are illustrated in the accompanying Figures. In the drawing.

DETAILED DESCRIPTION OF PREFERRED EMBODIMENTS

The invention is now explained more fully, by way of example, with reference to the accompanying drawings. However, the embodiments are only examples which are not to restrict the inventive concept to one specific arrangement.

Figure 1:
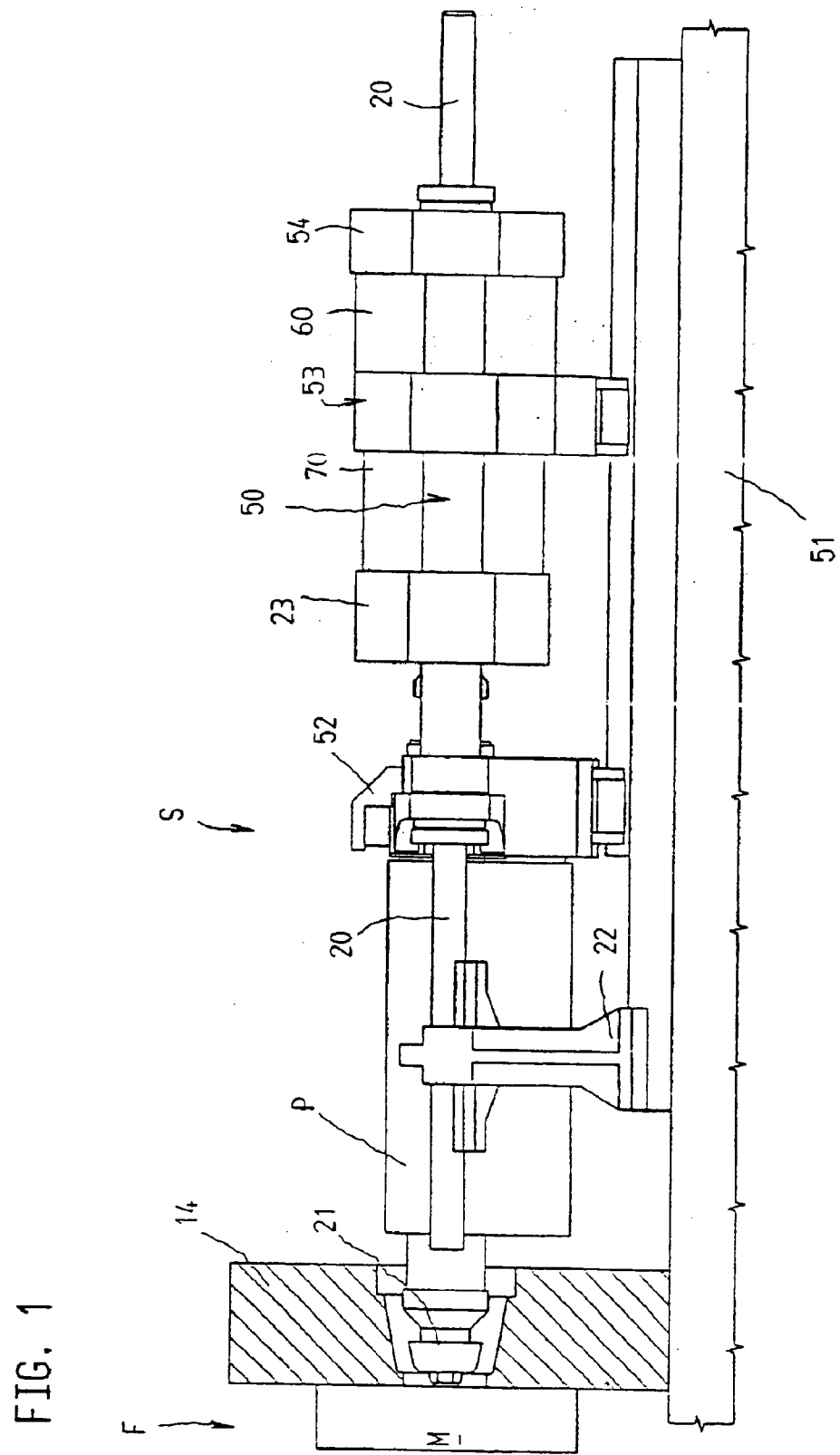
FIG. 1 illustrates an injection molding unit moved onto the stationary mould carrier of a mould closing unit.

FIG. 1 illustrates initially the injection molding unit of an injection molding machine for processing plastics materials and other plasticisable compounds, such as, for example, ceramic or metallic pulverulent compounds. A plasticising cylinder P is accommodated in the injection molding unit on a carrier block 52. The plasticisable compound is plasticised in the plasticising cylinder and injected into an injection mould M via a nozzle 21. For such purpose, the nozzle 21 penetrates the stationary mould carrier 14. The front portion of the injection molding unit S is supported on the machine base 51 via a supporting member 22 and guided and supported on the machine base via a guiding element 53. In order to fit the nozzle 21 onto the injection mould M, and to remove such if necessary, nozzle driving units 50 are provided which are hydraulically configured in FIG. 2. The cylinders of the hydraulic nozzle driving unit 50 form, with the carrier block 52 and a closure 54, a rigid frame which is guided on guide bars 20. The guiding element 53 is guided on the cylinders of the nozzle drive 50.

Figure 2:
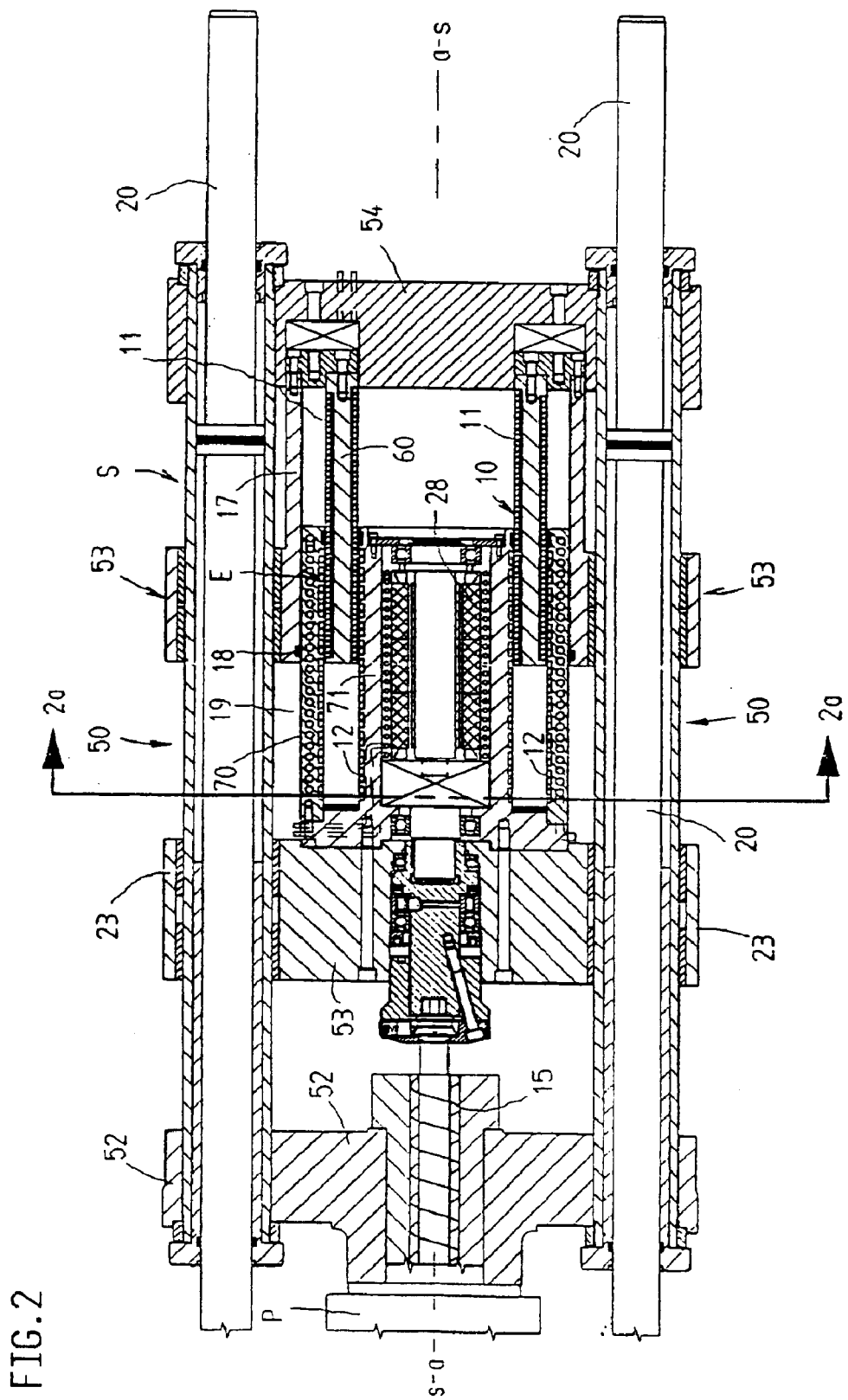
FIG. 2 is a horizontal sectional view through the injection molding unit in the region of carrier block and injection bridge.
Figure 2A:
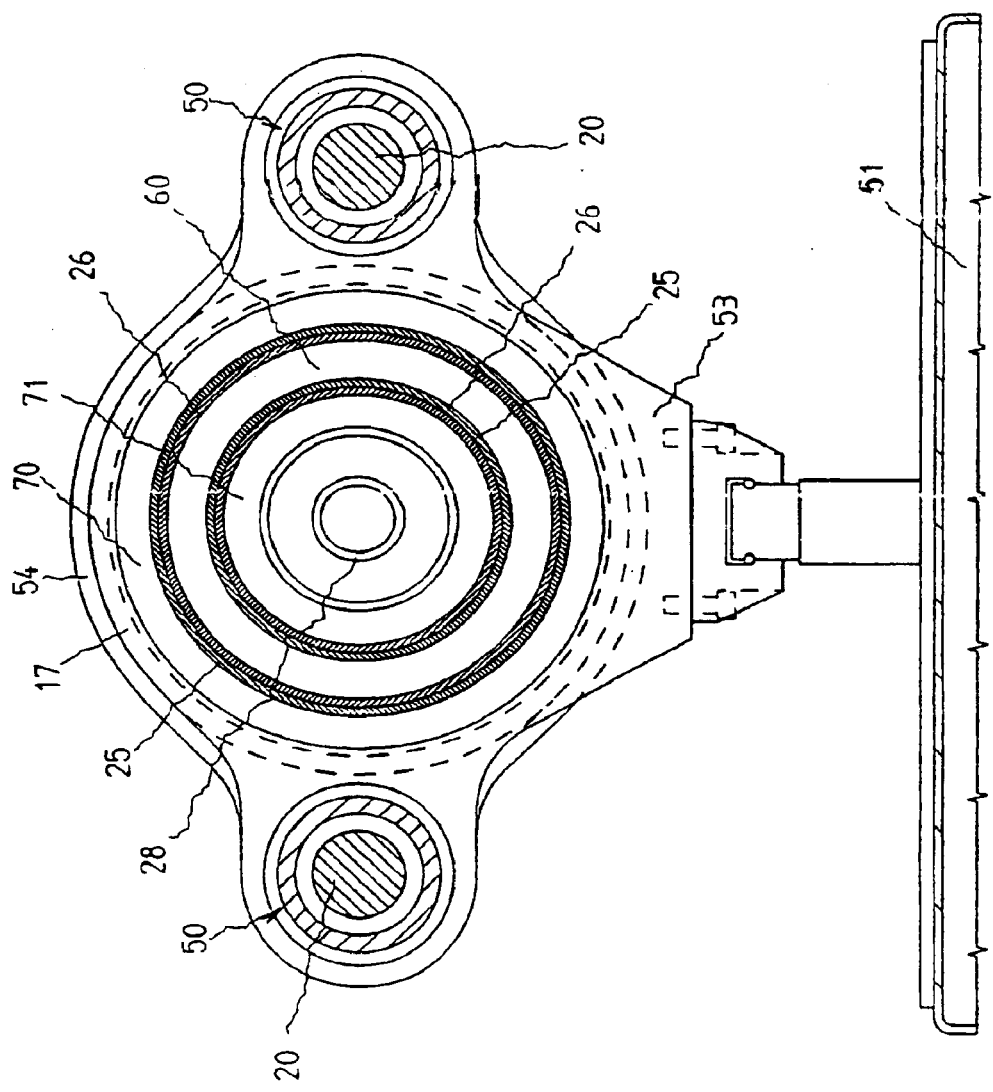
FIG. 2a is a sectional view taken along the line 2a—2a of FIG. 2.

In order to inject plasticised material into the injection mould, an injection unit E is provided. When the injection unit is actuated, the injection bridge 23 and, hence, the feed screw is axially moved. The injection bridge 23 carries the metering motor 28, by means of which a feeding means15—a feed screw in the embodiment—can be rotated. While the metering motor 28 has to produce a rotary movement to rotate the feeding means15, translatory movements are required to drive the nozzle and for injection purposes. A linear motor is used as the electrical driving units for these translatory movements, and it includes a rotor having magnets disposed along a first cylindrical surface 11. The linear motor also has a stator with stator windings 26 disposed along an additional cylindrical surface 12. The cylindrical surfaces 11 and of the stator and rotor are concentrically disposed, so that the magnetic face, which is required to produce suitable advancing forces for movements in the injection molding machine, can be increased. So that the relatively high bearing forces are eliminated, not only are the circular surfaces provided; additionally the stator windings 26 and preferably also the magnets 25 of the stator are disposed symmetrically relative to the axis of movement a—a of the linear motor. FIG. 2a illustrates the circular surfaces and shows the application of corresponding forces on the basis of the force density which can be achieved at these faces.

In all of the embodiments, what is to be understood by the term surfaces is both the external surface of a cylinder and the internal surface of a pipe; in both cases, cylindrical surfaces 11 and 12 are involved. The magnets 25 may be permanent magnets, but they may also be separately excited coils having an iron core. Furthermore, the driving unit may be operated in a controlled or regulated manner, that is to say, for example, it can be operated as a servomotor over a regulating path.

Figure 4:
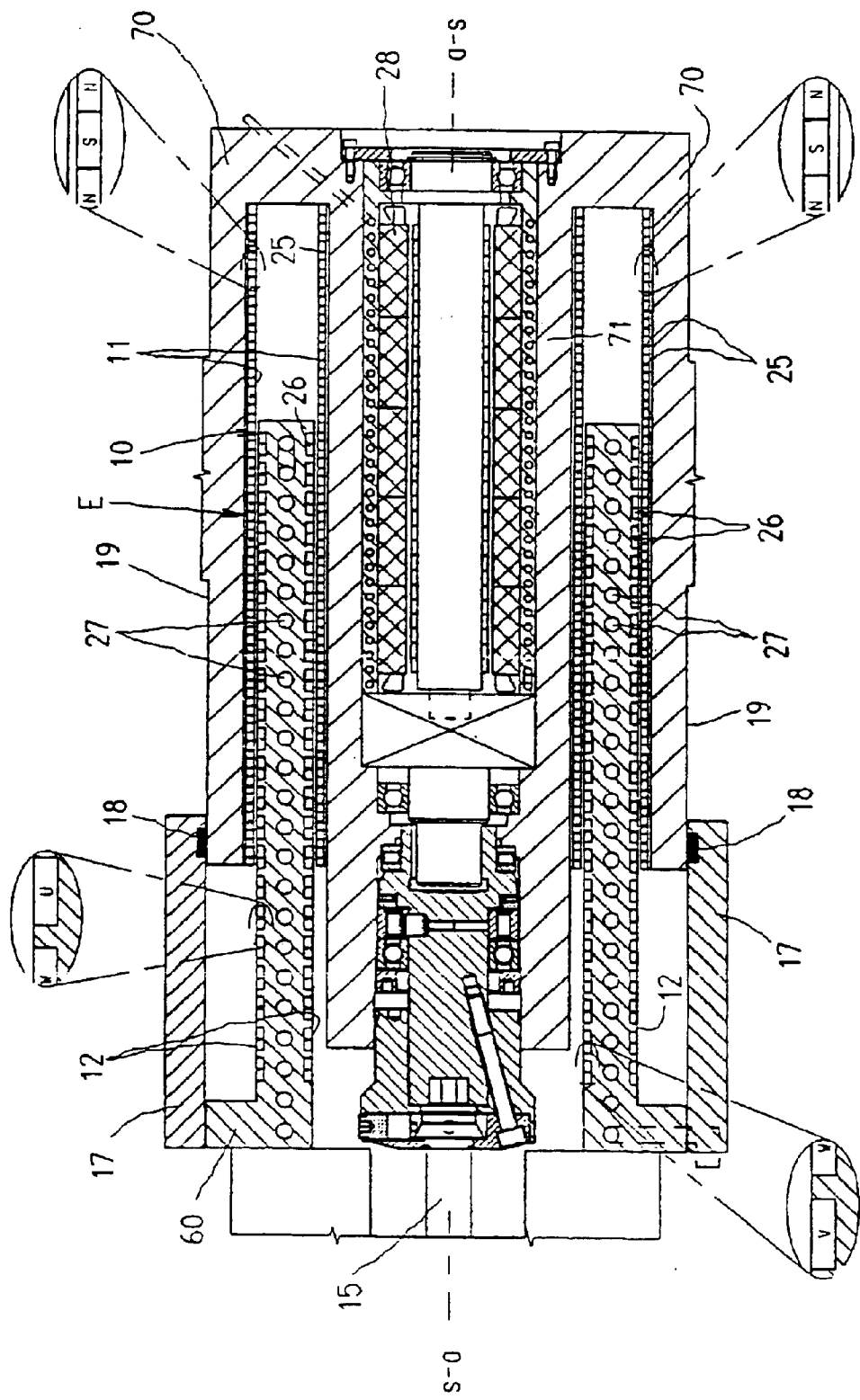
FIG. 4 illustrates an enlarged portion taken from FIG. 3 in the region of the injection bridge.

In the case of the injection molding units illustrated in FIGS. 1 and 4, the linear motors of the injection unit are so disposed that the axis of movement a—a of the linear motor is, at the same time, the injection axis s—s of the injection molding unit S. When transferred to the mould closing unit shown in FIGS. 5–8 (see below), the axis of movement a—a of the linear motor is, at the same time, the axis of symmetry s—s of the mould closing unit F. For simplification purposes, the same identification s—s is used in both cases, and also, moreover, the reference numerals in the drawings are so selected that identically acting parts are provided with identical reference numerals.

To produce the necessary advancing forces, the cylindrical faces are disposed in a stacked manner. FIGS. 2 and 2a illustrate how a plurality of identically acting first surfaces 11 are stacked with a corresponding number of additional surfaces 12 for the injection movement. A cylinder 60 is supported on the closure 54, which is moved jointly with the carrier block 52 via the nozzle driving unit 50 as a consequence of the connection, and it has identically acting surfaces on its inside and on its outside. It may be open to question whether these surfaces are initial surfaces of the rotor or additional surfaces of the stator. In the embodiment, the surfaces of the cylinder 60 are first surfaces of the rotor. These surfaces are formed by identically acting additional or first surfaces of two concentric cylinders 70 and 71. When viewed externally, the impression is given that piston rod and cylinder of a piston-cylinder-unit would extend into one another. The surfaces are so disposed that the internal surface of the external cylinder 70 co-operates with the outside of the cylinder 60, and the external surface of the internal cylinder 71 co-operates with the inside of the cylinder 60. A greater advancing force than was usual hitherto can be produced by this stacking arrangement.

In order to protect the linear motor from contamination and, if necessary, to produce a chamber which can be provided with a suitable lubricant, an additional cylinder 17 moves jointly with the cylinder 60 and is, in this respect, just like the cylinder 60 connected to the closure 54. This cylinder 17 overlaps the linear motor and has, at its front end on the left of FIG. 2, a mounting 18 which cooperates with a bearing face 19 of the cylinder 70. The parts of the linear motors are guided towards one another via mounting 18 and bearing face 19, and, in consequence, the parts of the injection molding machine are centered in order to ensure a precision which is required to produce high-quality parts. At the same time, the mounting 18 and bearing face 19 act in a sealing manner.

Figure 3:
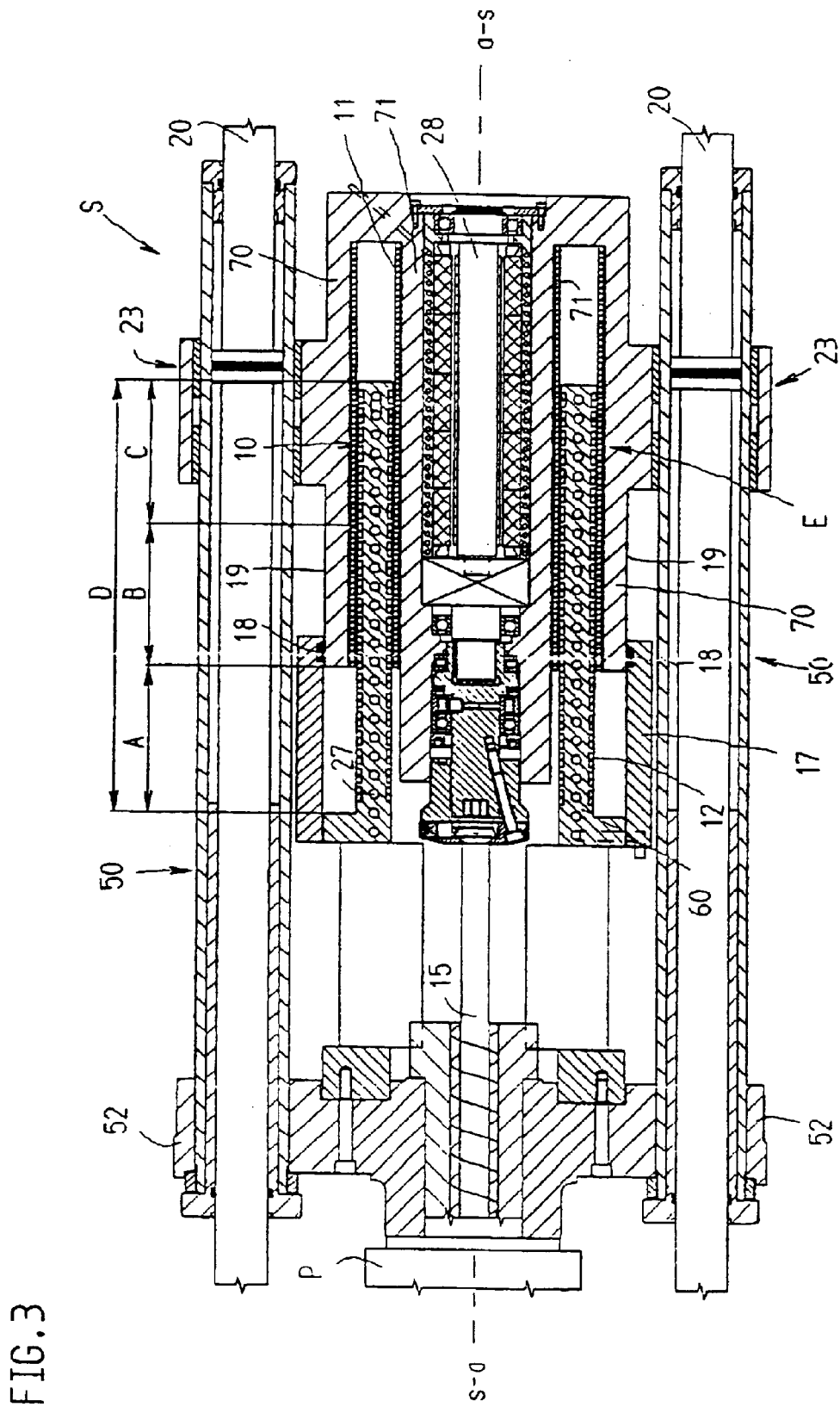
FIG. 3 is a sectional view according to FIG. 2 of an alternative embodiment.

If the stator windings of the concentric cylinders 70 and 71 are energized, an advancing movement results in co-ordination with the magnet of the cylinder 60. While the cylinder 60 remains in an unchanged manner, the concentric cylinders 70 and 71 are moved jointly with the injection bridge 23. FIG. 3 illustrates an alternative embodiment of the injection molding unit S, where cylinder 60 and concentric cylinders 70 and 71 have been reversed. The cylinder 60, with which the cylinders 70 and 71 co-operate, is mounted on the carrier block 52, said cylinders now being a component part of the injection bridge 23. The reversal necessitates a reversal of rotor and stator. If, in the first embodiment, the cylinder 60 was the rotor, then it is now the stator. The injection bridge 23 also slides here on the cylinders of the hydraulic nozzle driving unit, but a frame, which reinforces the injection molding unit S per se, is not provided as in the first case. The additional cylinder 17 supports the linear motor by means of mounting 18 and in co-operation with the bearing face 19.

According to FIG. 3, the stator windings 26 can be divided into a plurality of separate electrical switching zones along their axis of movement a—a. The entire range of movement is shown by the range D. During displacement, all of the switching zones A, B and C are involved during the injection operation, above all towards the end, in order to permit the required forces to be applied with the participation of all of the switching zones. However, as soon as a specific zone is no longer in operative connection with the surfaces of the rotor by means of its face, the zones which are no longer required can be switched-off to save energy.

Cooling ducts 27, which lie behind or adjacent the stator windings 26 when viewed from the magnets 25, are associated with said stator windings in the cylindrical walls of the stator, so that the heating, caused by the current, can be reliably dissipated. The cooling medium employed may be used at the same time to control the temperature of other component parts in the injection molding machine.

The enlarged portion according to FIG. 4 shows that the magnets 25 are also attached to the walls of the cylinders 70 and 71. The magnets are provided with the identifications for their north-south (N-S) poles. The stator windings 26, however, are identified with U-V. The injection bridge, which is substantially formed by the concentric cylinders 70 and 71, has sufficient space in its center, that is to say in the center of the cylinder 71, to support the metering motor 28 as well as the locking arrangement for the feeding means 15.

Figure 15:
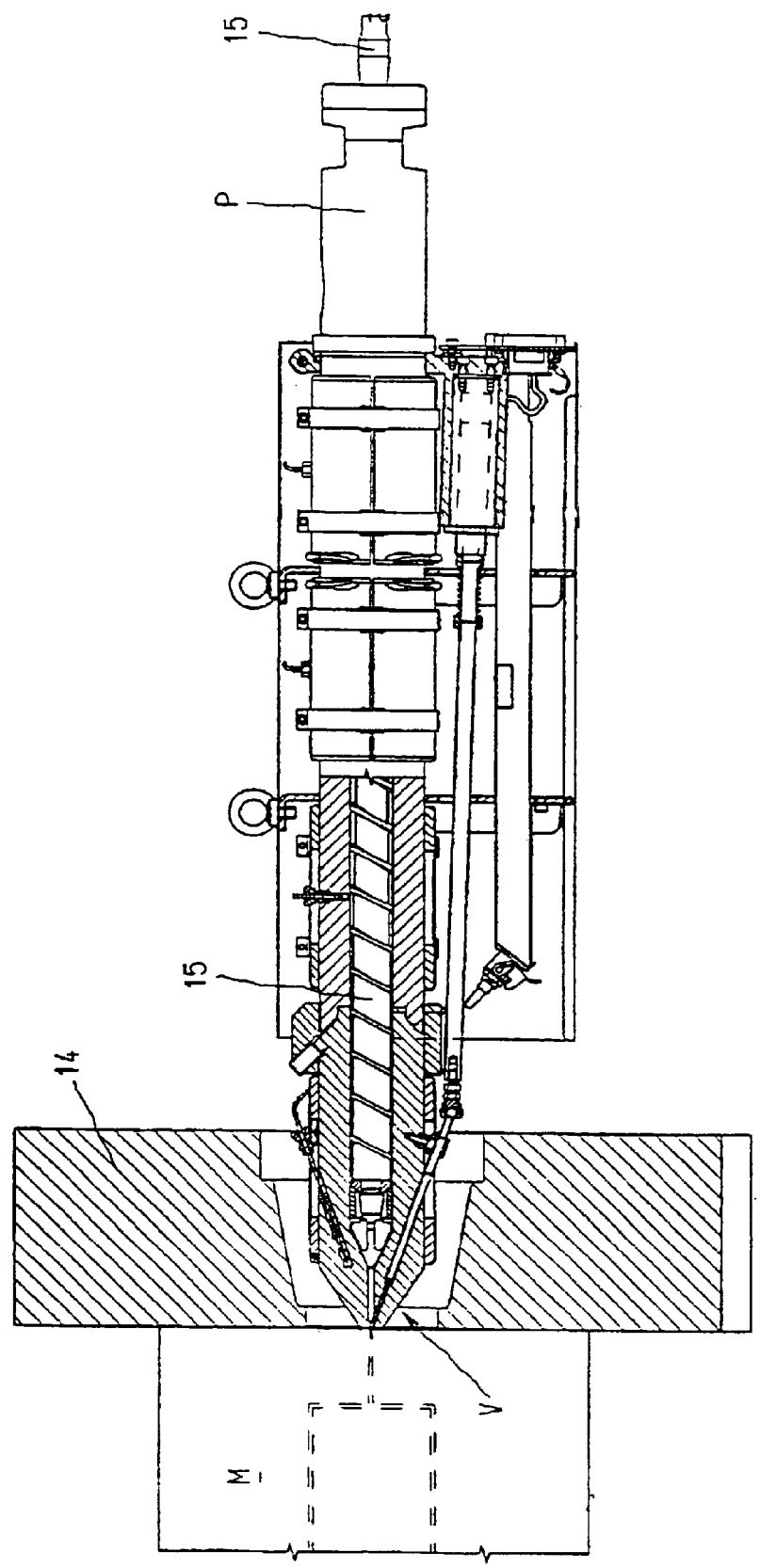
FIG. 15 illustrates an injection molding unit provided with a closure nozzle.

The linear motor, as an electrical driving unit, may also be employed for other assemblies of the injection molding machine. It is possible, more especially, to provide the translatory shafts with linear motors. On the injection molding side, such shafts are the driving unit for fitting the nozzle 21 onto the injection mould as well as the already explained injection means E or the actuating mechanism for a closure nozzle V (FIG. 15). On the side of the mould closing unit F, this is, for example, the closure mechanism for moving the movable mould carrier 13 towards and away from the stationary mould carrier 14, which may apply the closing force if necessary. If the mould closing unit is constructed so that the closing mechanism only accomplishes the mould closing movement, while the closing force is applied by a separate arrangement, this separate arrangement may be provided with a linear motor. On the mould closing side, an ejector unit 16 or a core puller unit K (FIG. 5) on the injection mould M may also be provided with a linear motor.

Figure 5:
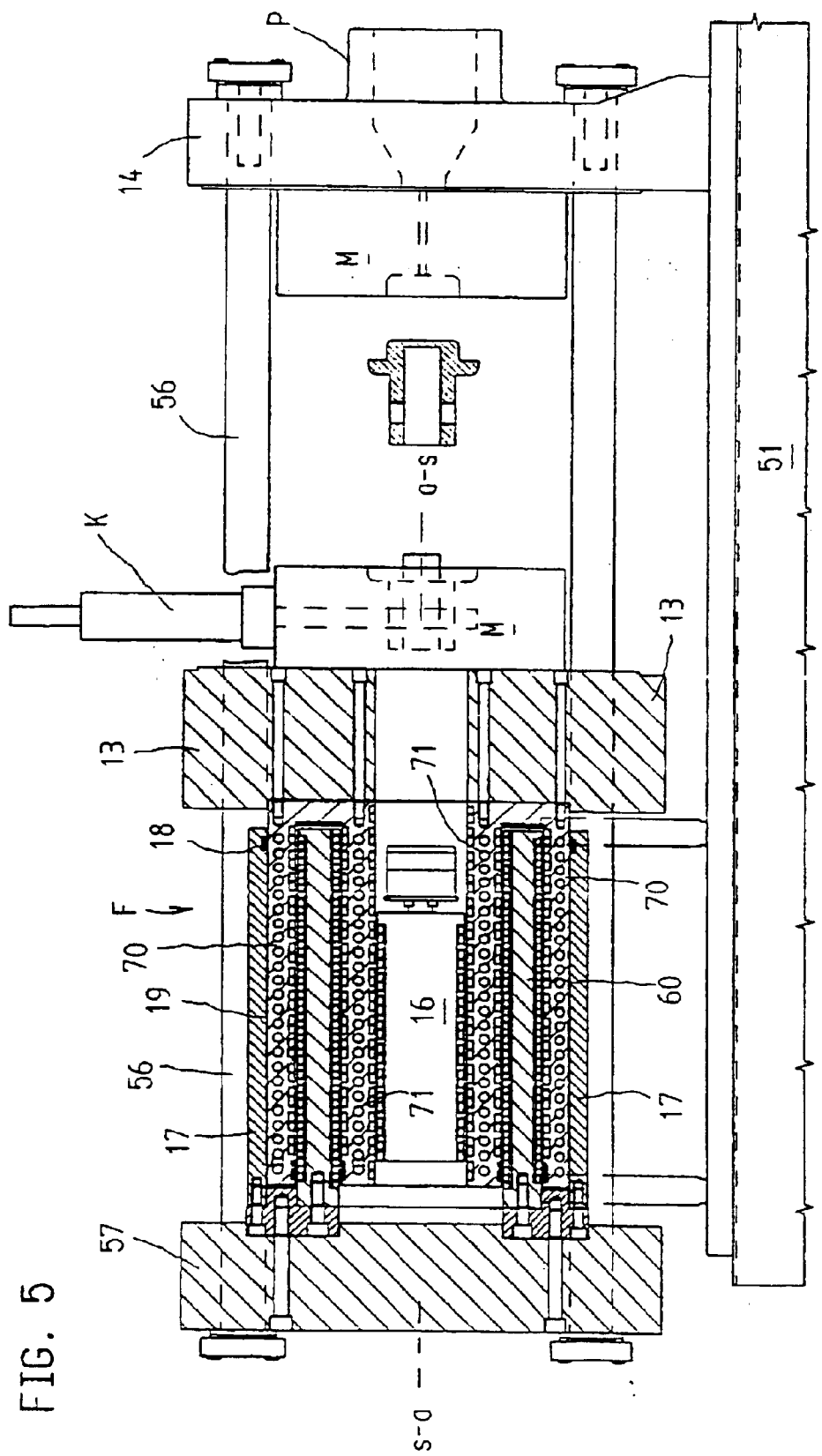
FIG. 5 is a side elevational view of a mould closing unit, which is shown partially in section.
Figure 6:
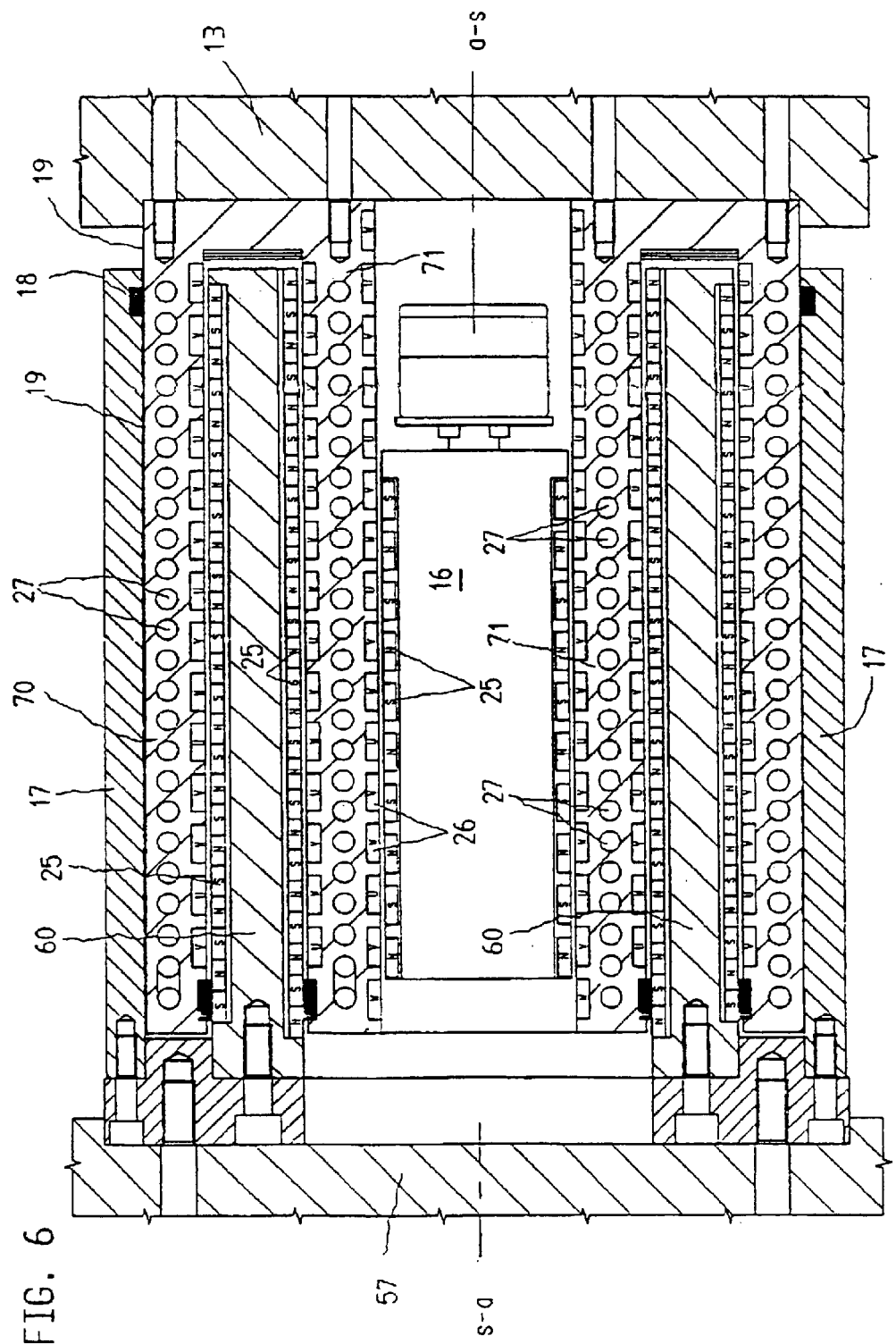
FIG. 6 illustrates an enlarged portion taken from FIG. 5 in the region of the movable mould carrier.

FIG. 5 illustrates a mould closing unit F, wherein the movable mould carrier 13 is moved along guide bars 56 by means of the closing mechanism. During displacement, the injection mould M is alternately closed and opened. The closing mechanism is supported on a supporting element 57. FIG. 6 illustrates an enlarged portion of FIG. 5 in the region of the movable mould carrier. A comparable construction, such as was previously the case with the injection molding unit, is also apparent here. A cylinder 60, with an inside and an outside, is the rotor with the magnet 25. The movable mould carrier, however, carries the concentric cylinders 70 and 71 as the stator. The cylinder 60 and the additional cylinder 17 are mounted on the supporting element 57, said additional cylinder being mounted and guided on the bearing face 19 here also with the mounting 18. In the embodiment, therefore, relatively large cylinders are also stacked inside one another here. Sufficient space is available in the interior of the cylinder 71 to accommodate an ejector unit 16, which is also actuated as a linear motor. An extremely short structural design is therefore produced.

If desirable, however, a plurality of individual cylinders may also be stacked around the closing axis s—s and/or disposed concentrically, which cylinders are then operated identically in this respect.

Figure 7:
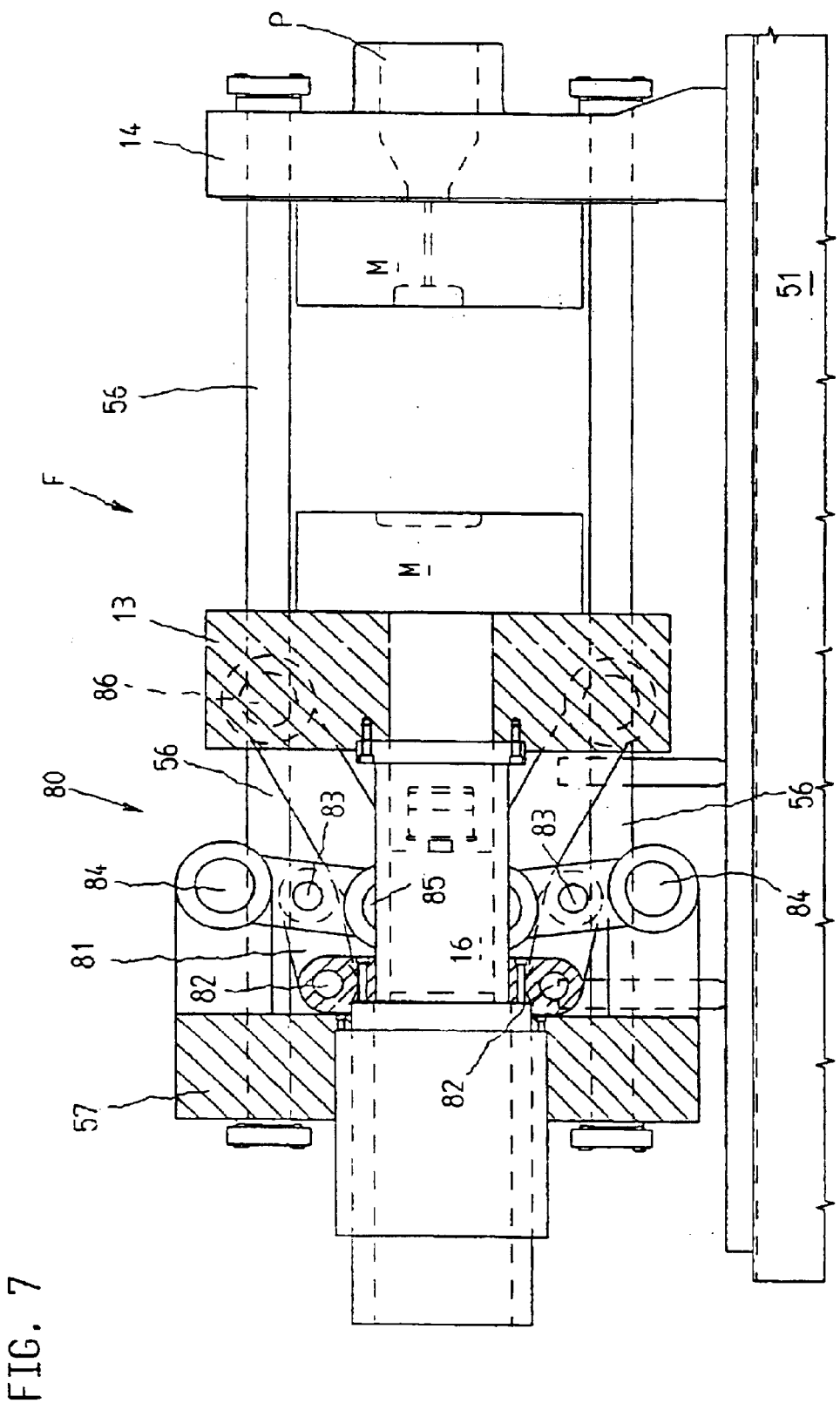
FIG. 7 is a side elevational view, shown partially in section, of a 5-point toggle lever of a mould closing unit.
Figure 8:
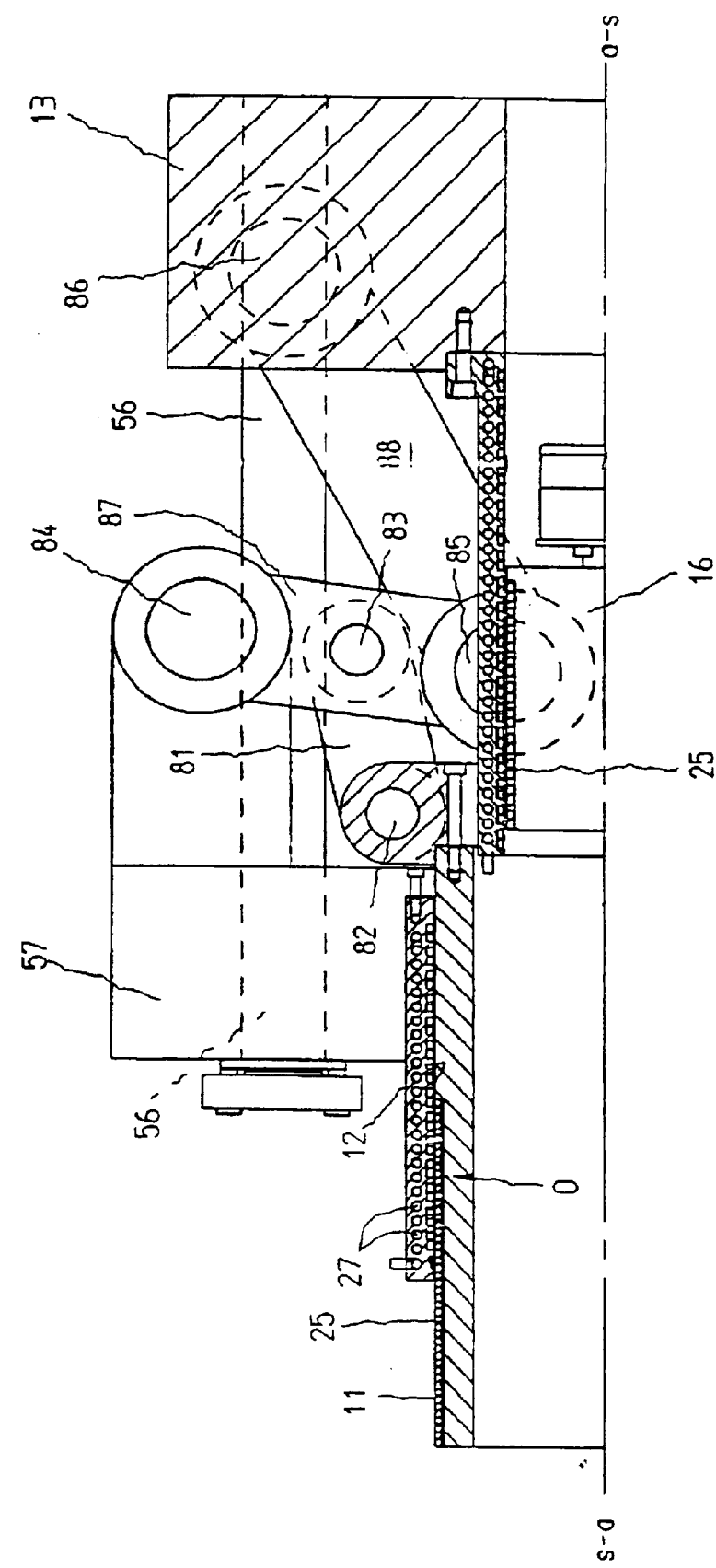
FIG. 8 is an enlarged view of one of the two 5-point toggle levers according to FIG. 7.

The linear motor may also be used for other types of closing mechanisms, though the description of the stacking has been somewhat curtailed hereinafter to achieve a clear description. FIGS. 7 and 8 illustrate a closing mechanism with a multi-point toggle lever, here a 5-point toggle lever. The movable mould carrier is guided on guide bars 56, and an ejector unit is to be actuated centrally in the movable mould carrier via a linear motor. FIG. 8 illustrates the structure of the 5-point toggle lever 80. The toggle lever is supported on the supporting element 57 by the pivot joint 84. It is supported on the movable mould carrier 13 by the pivot joint 86. The pivot joints 84 and 86 are interconnected via two arms 87 and 88 which, in turn, for their part are pivotally interconnected at the pivot point 85. A pivot point 83 for a pivotal arm 81 is provided on the arm 87. Said pivotal arm communicates with the drive at the pivotal point 82. If the drive is moved linearly along the closing axis, the arm 81 urges the arm 87 in an arc forwardly and then upwardly. The arms 87 and 88 thereby come into an extended position and are prevented from falling-back by automatic locking, supported by the arm 81. The advantage of this embodiment is that, in the extended position, no force has to be applied to the arm 81 in order to maintain the extended position. This is advantageous since, during the linear movement, the covering of the cylindrical surfaces 11 and 12 also reduces, so that the force, produced by the linear motor, is smaller towards the end of the movement. FIG. 8 also shows that the linear motor for the ejector unit 16 can be guided back into the cylinder of the linear motor of the closing mechanism 0.

Figure 9:
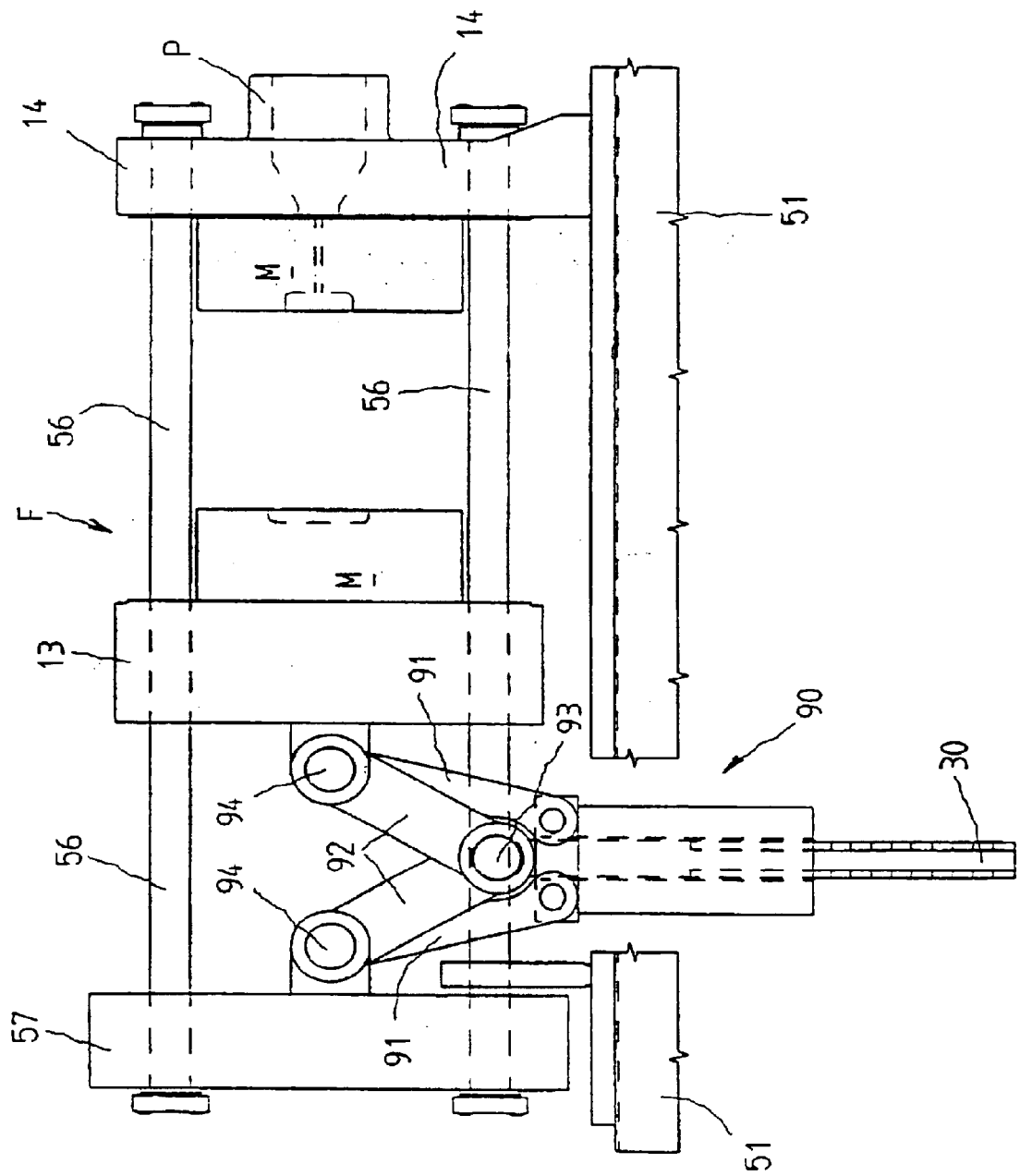
FIG. 9 illustrates a mould closing unit having a Y-shaped toggle lever.
Figure 10:
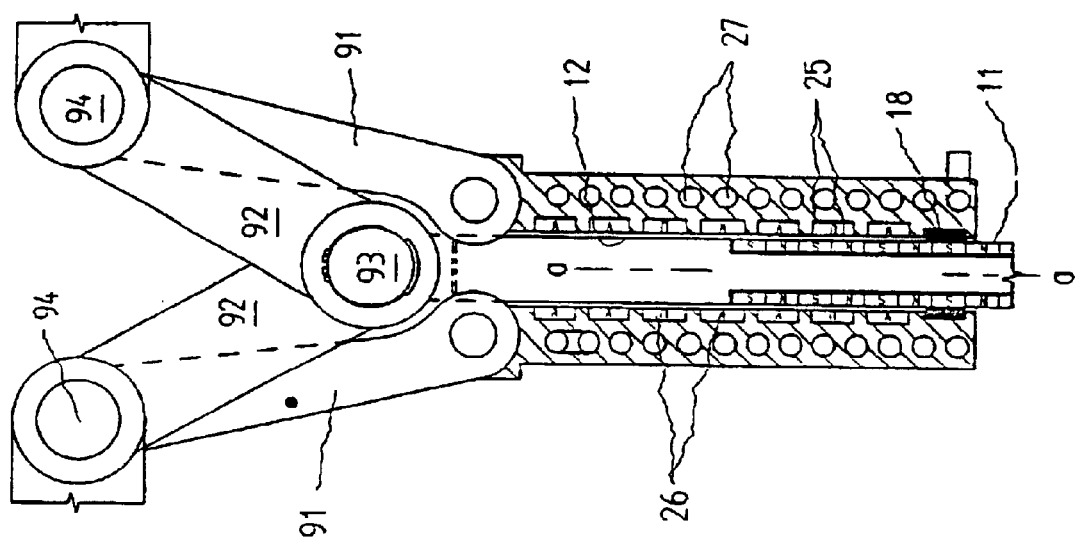
FIG. 10. illustrates the enlarged Y-shaped toggle lever.

An alternative type of closing mechanism is the Y-shaped toggle lever shown in FIGS. 9 and 10, which is otherwise constructed like the previously described mould closing units F. The Y-shaped toggle lever 90 supports the driving unit, in that it suspends said unit in a freely displaceable manner via two pivotal arms 91. If the rotor 30 is moved, it acts on the pivotal point 93 and brings the arms 92 into the extended position. Here also, a relatively small force is to be applied in the extended position. The rotor 30 may be so configured that, during the application of a small force, it only slightly co-operates with the surfaces of the stator while, during the application of a high force, a total co-operation of the surfaces 11 and 12 is effected.

Figure 11:
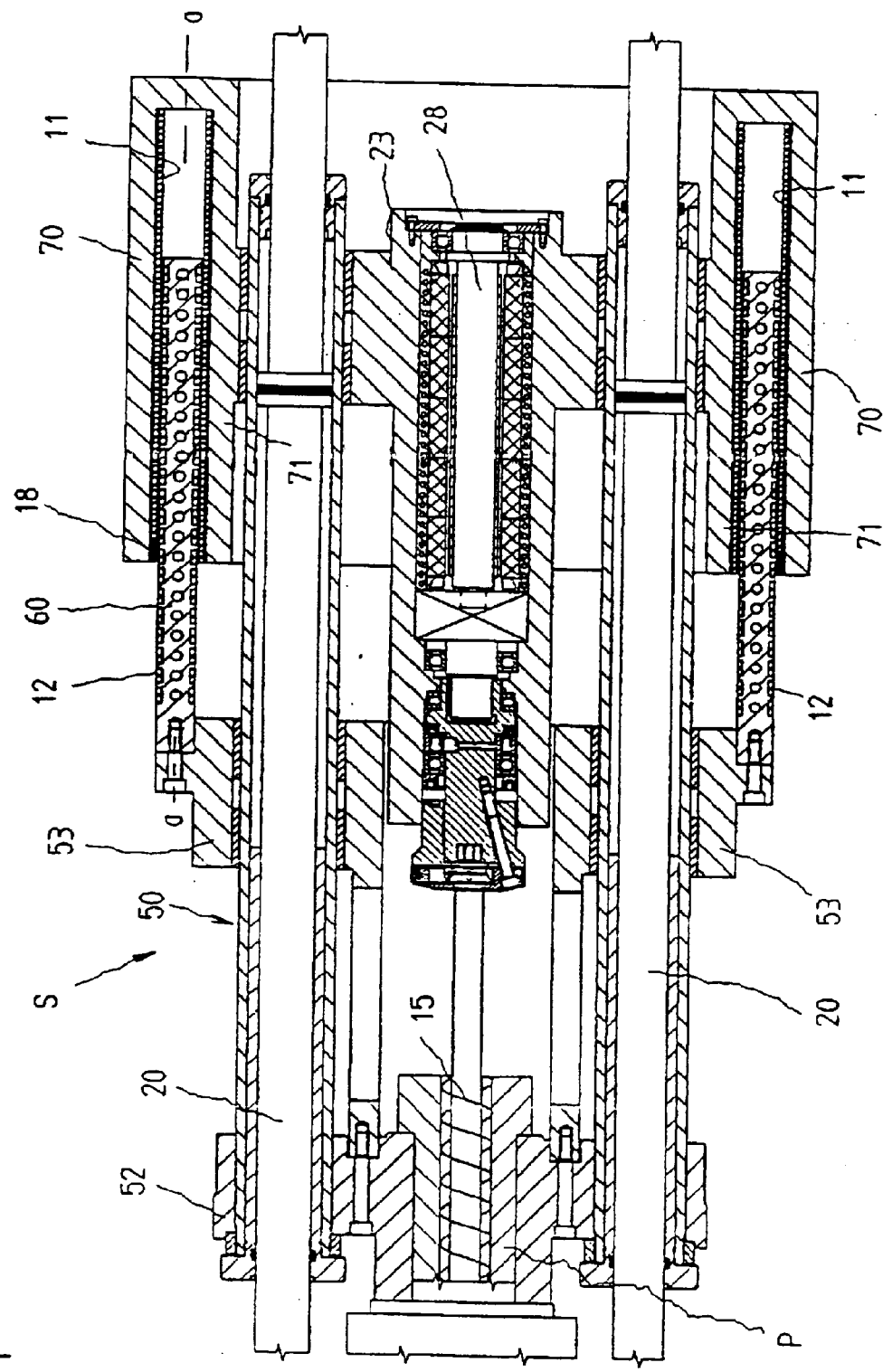
FIG. 11 is a horizontal sectional view through an injection molding unit in the region of the carrier block and injection bridge in an alternative embodiment.

It is thereby indicated that, basically, the cylindrical surfaces can be so disposed that, when a high force has to be applied, a large covering of the surfaces 11 and 12 also exists, so that a high force is produced also as a consequence of a large abutment face. This is explained for an injection molding unit S with reference to FIG. 11. The linear motor is employed as injection means E, wherein the covering of the cylindrical surfaces 11 and 12 is increasing when the nozzle is fitted onto the injection mould M. This is achieved when the cylinder 60 is supported on the carrier block. Here, the cylinder 60 is the stator. In order to move the injection bridge, the cylinders 70 and 71 are pulled over the cylinder 60 so that, during the injection process, a greater force is produced the further the feed screw is moved in the direction towards the injection mould. In consequence, the injection bridge 23 moves to the left in FIG. 11.

Figure 12:
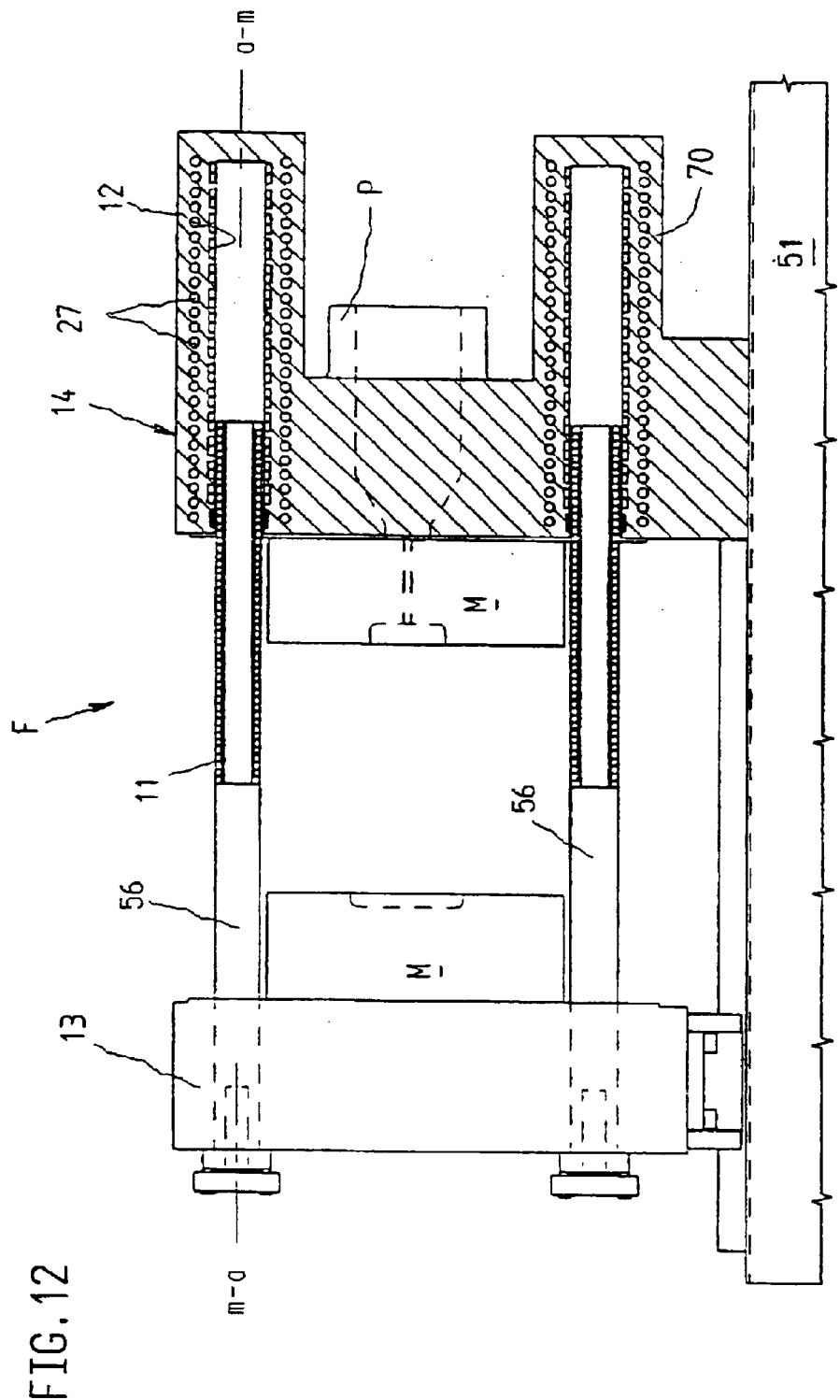
FIG. 12 is a side elevational view, shown partially in section, of a mould closing unit of the pulling type.

The same principle can also be achieved with the mould closing unit. FIG. 12 illustrates a linear motor as the closing mechanism, the covering of the cylindrical surfaces 11 and 12 increasing during the application of the closing force. A mould closing unit is involved, wherein the movable mould carrier is pulled over the stationary mould carrier 14. In the embodiment, the bars 56 are not securely mounted on the stationary mould carrier. They are provided with the first surfaces in this region. If the stator is actuated on the stationary mould carrier, the rotor is pulled into the linear motor, so that a greater covering of the surfaces is produced with an increasing closing movement of the injection mould M, and maximum force is achieved at the end of the mould closing movement. FIG. 12 also shows that the linear motor has its axis of movement a—a coinciding with the central axis of the bar 56.

Figure 13:
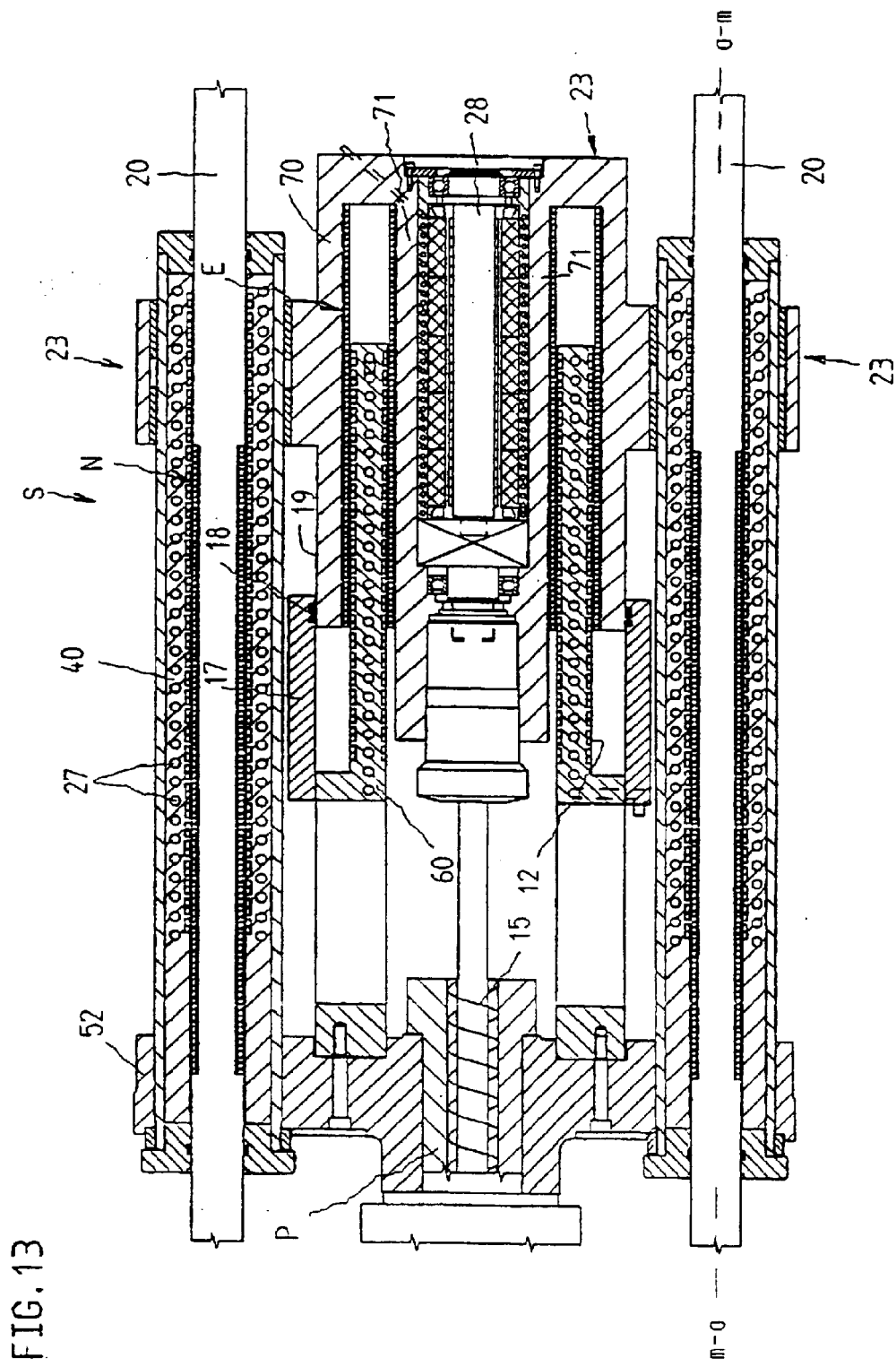
FIGS. 13 and 14 are views according to FIG. 11 of injection molding units in two additional embodiments.

With an otherwise identical structure as in FIG. 3, FIG. 13 shows that the nozzle driving unit, which was hydraulic in FIG. 3, may also be in the form of a linear motor. In this respect, the bars 20 are provided with magnets, so that they may serve as rotors of the nozzle driving unit N. They co-operate with a stator which slides along the bars 20. Because of this structure, a corresponding movement along the bars 20 is possible.

Figure 14:
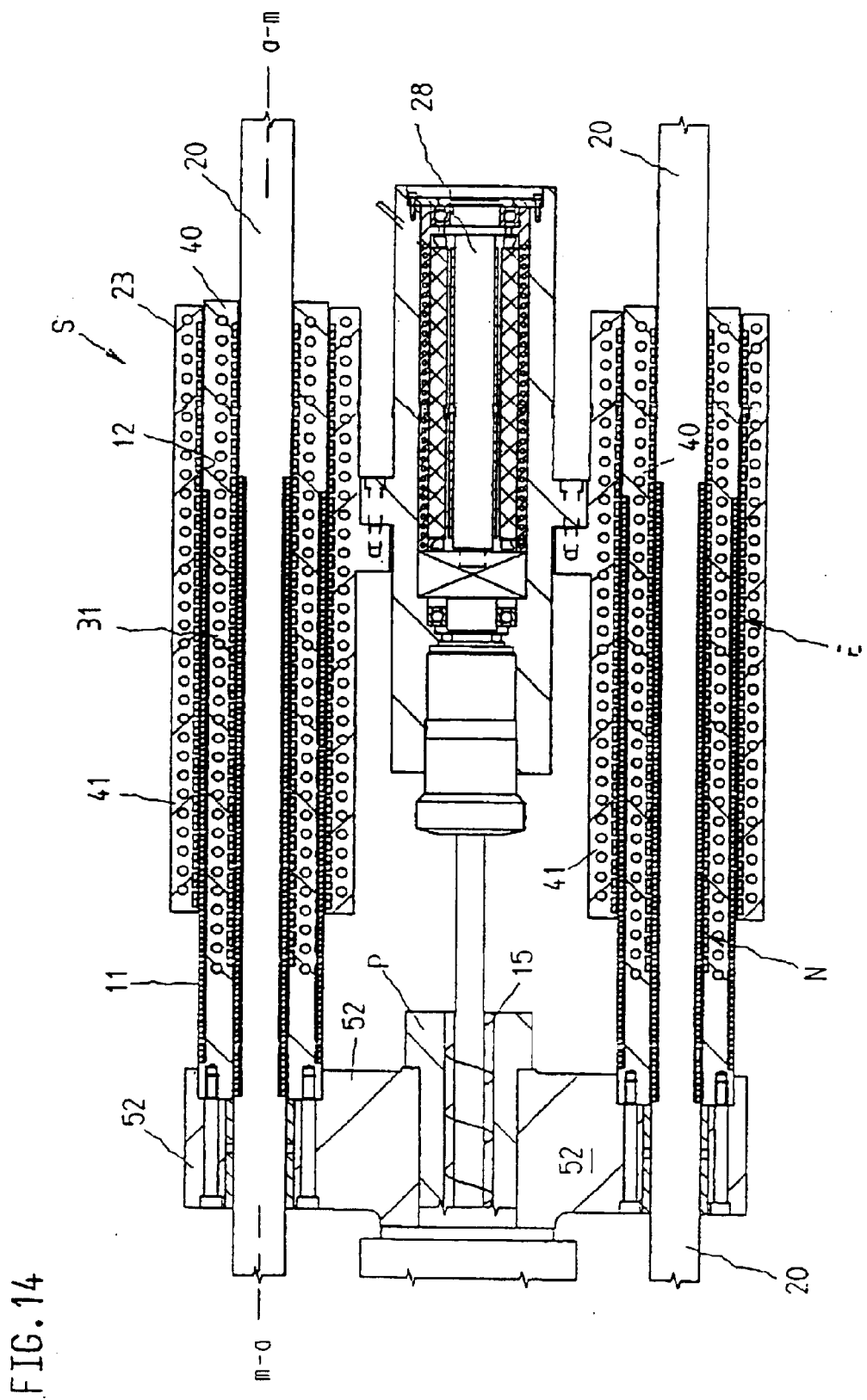

In an alternative embodiment, FIG. 14 shows that the axis of movement a—a of the linear motor may also coincide with the central axis of the guide bars 20 in the injection molding unit. In this embodiment, a stacking of injection means and nozzle driving unit N around the bars 20 is created. The nozzle driving unit N lies around the bar 20. The guide bar is the rotor, while a sleeve represents the stator 40. This sleeve is the stator on the inside and, in turn, is already the rotor with magnets for the injection means E on the outside. In consequence, an additional sleeve is placed around the sleeve as stator 41, which additional sleeve is, for its part, also the injection bridge 23. Finally, the injection bridge carries the metering motor 28.

It is self-evident that this description may be subjected to the most varied modifications, changes and adaptations, which range from equivalents to the dependent claims.

What is claimed is:

1. Injection molding machine for processing plastics material and plasticisable materials, comprising: an electric driving unit that is adapted to operate at least partially at least one of an injection molding unit and a mould closing unit, the electric driving unit including at least one linear motor, which has a rotor with magnets, disposed along it first cylindrical surface, and a stator with stator windings disposed along a second cylindrical surface, the first and second cylindrical surfaces being concentrically disposed, and the stator windings being substantially symmetrical relative to an axis of movement of the linear motor, wherein a plurality or identically acting first surfaces are stacked with a corresponding number of identically acting second surfaces, at least one of the first and second surfaces being operable jointly in operative connection, wherein the identically acting first or second surfaces are on an outside and inside of a first cylinder, and wherein the identically acting first and second surfaces are so disposed on concentric second and third cylinders that an internal surface of the second cylinder cooperates with the outside of the first cylinder, and an external surface of the third cylinder cooperates with the inside of the first cylinder.

2. Injection molding machine according to claim 1, wherein the magnets are separately excited coils with an iron core.

3. Injection Molding machine according to claim 1, wherein the electric driving unit is a regulated servo driving unit.

4. Injection molding machine according to claim 1, wherein the linear motor is cylindrical and is overlapped on the outside by a cylinder, which guides faces of the rotor and the stator, which are moved towards one another, along a separate bearing face by means of at least one mounting.

5. Injection molding machine according to claim 1, wherein the stator windings are divided along the axis of movement into a plurality of separate electrical switching zones.

6. Injection molding machine according to claim 1, further comprising cooling ducts, which lie behind or adjacent the stator windings when viewed from the magnets are associated with said stator windings, wherein a temperature of the cooling ducts is controlled by means of a cooling medium.

7. Injection molding machine according to claim 1, wherein the electric driving unit is also adapted to move a movable mould carrier towards a stationary mould carrier and away from stationary carrier and further adapted to apply a closing force.

8. Injection molding mechanic according to claim 7, and wherein there is a space in an interior of the third cylinder to accommodate an ejector unit.

9. Injection molding machine according to claim 1, wherein the electric driving unit is also adapted to apply a closing force.

10. Injection molding machine according to claim 1, wherein the electric driving unit is also adapted to operate a driving unit for fitting a nozzle onto an injection mould.

11. Injection molding machine according to claim 1, wherein the electric driving unit is also adapted to move a feeding means in the injection moulding unit.

12. Injection molding machine according to claim 1, wherein the electric driving unit is also adapted to operate an ejector unit.

13. Injection molding machine according to claim 1, wherein the electric driving unit is also adapted to operate a core pulling unit on an injection mould.

14. Injection molding machine according to claim 1, wherein the electric driving unit is also adapted to operate a driving unit for a closure nozzle.

* * * * *